United States Patent
Maehara

(10) Patent No.: US 11,167,987 B2
(45) Date of Patent: Nov. 9, 2021

(54) SECONDARY PARTICLES FOR ANISOTROPIC MAGNETIC POWDER AND METHOD OF PRODUCING ANISOTROPIC MAGNETIC POWDER

(71) Applicant: NICHIA CORPORATION, Anan (JP)

(72) Inventor: Hisashi Maehara, Anan (JP)

(73) Assignee: NICHIA CORPORATION, Anan (JP)

( * ) Notice: Subject to any disclaimer, the term of this patent is extended or adjusted under 35 U.S.C. 154(b) by 539 days.

(21) Appl. No.: 15/980,254

(22) Filed: May 15, 2018

(65) Prior Publication Data

US 2018/0334386 A1 Nov. 22, 2018

(30) Foreign Application Priority Data

May 17, 2017 (JP) .............................. JP2017-098035

(51) Int. Cl.
*H01F 1/053* (2006.01)
*C01B 21/076* (2006.01)
*H01F 1/055* (2006.01)
*H01F 1/059* (2006.01)

(52) U.S. Cl.
CPC ......... *C01B 21/0761* (2013.01); *H01F 1/059* (2013.01); *H01F 1/0551* (2013.01); *H01F 1/0593* (2013.01); *C01P 2002/52* (2013.01); *C01P 2002/54* (2013.01); *C01P 2006/42* (2013.01)

(58) Field of Classification Search
CPC .............. C01B 21/076; C01B 21/0761; C01B 21/0763; C01B 21/0765; C01B 21/0766; C01B 21/0768; H01F 1/053; H01F 1/055; H01F 1/0551; H01F 1/0552
See application file for complete search history.

(56) References Cited

U.S. PATENT DOCUMENTS

| | | | |
|---|---|---|---|
| 4,765,848 A | 8/1988 | Mohri et al. |
| 4,820,433 A | 4/1989 | Yamamoto |
| 6,334,908 B1 | 1/2002 | Kawano et al. |
| 6,413,327 B1 | 7/2002 | Okajima et al. |
| 2005/0067052 A1 | 3/2005 | Honkura et al. |
| 2008/0066575 A1 | 3/2008 | Yang |

FOREIGN PATENT DOCUMENTS

| | | |
|---|---|---|
| JP | H09-97732 A | 4/1997 |
| JP | 2000-049006 A | 2/2000 |
| JP | 2000-348922 A | 12/2000 |
| JP | 2001-181713 A | 7/2001 |
| JP | 2001-230111 A | 8/2001 |
| JP | 2002-217010 A | 8/2002 |
| JP | 2004-111515 A | 4/2004 |
| JP | 2008091873 A | 4/2008 |
| JP | 2014-080653 A | 5/2014 |
| JP | 2014-236195 A | 12/2014 |
| JP | 2015-113481 A | 6/2015 |

OTHER PUBLICATIONS

Kaszuwara. The effect of tungsten addition on the magnetic properties and microstructure of SmFeN-a-Fe nanocomposites. Materials Letters 42 2000 383-386 (Year: 2000).*
Xue. Study on Preparation of the Precursor of Sm2Fe17 Alloy by Oxalate Co-precipitation. Applied Mechanics and Materials vol. 697 (2015) pp. 118-122 (Year: 2014).*
Google Patents. Machine Translation of JP2008091873. Retrieved from https://patents.google.com/patent/JP2008091873A/en?oq=JP2008091873 on Dec. 31, 2020 (Year: 2008).*
United States Patent and Trademark Office, Non-Final Office Action issued to U.S. Appl. No. 15/387,997 dated Apr. 17, 2020, 19 pages.
United States Patent and Trademark Office, Final Office Action issued to U.S. Appl. No. 15/387,997 dated Sep. 21, 2020, 16 pages.
United States Patent and Trademark Office, Non-Final Office Action issued to U.S. Appl. No. 15/387,997 dated Mar. 15, 2019, 21 pages.
Non-Final Office Action, United States Patent and Trademark Office, issued to U.S. Appl. No. 15/387,997 dated Apr. 30, 2021, 15 pages.
Final Office Action, United States Patent and Trademark Office, issued to U.S. Appl. No. 15/387,997 dated Sep. 17, 2021, 14 pages.

* cited by examiner

*Primary Examiner* — Matthew E. Hoban
(74) *Attorney, Agent, or Firm* — Hunton Andrews Kurth LLP

(57) ABSTRACT

Provided are a method of producing a titanium-containing rare earth-iron-nitrogen anisotropic magnetic powder having good magnetic properties, and secondary particles for a titanium-containing anisotropic magnetic powder. The method includes: obtaining a first precipitate containing R, iron, and titanium by mixing a first precipitating agent with a solution containing R, iron, and titanium, wherein R is at least one selected from Sc, Y, Pr, Nd, Pm, Sm, Gd, Tb, Dy, Ho, Er, Tm, and Lu; obtaining a second precipitate containing R and iron by mixing, in the presence of the first precipitate, a second precipitating agent with a solution containing R and iron; obtaining an oxide containing R, iron, and titanium by calcining the second precipitate; obtaining a partial oxide by heat treating the oxide in a reducing gas atmosphere; obtaining alloy particles by reducing the partial oxide; and obtaining an anisotropic magnetic powder by nitriding the alloy particles.

11 Claims, No Drawings

SECONDARY PARTICLES FOR ANISOTROPIC MAGNETIC POWDER AND METHOD OF PRODUCING ANISOTROPIC MAGNETIC POWDER

CROSS-REFERENCE TO RELATED APPLICATION

This application claims priority to Japanese Patent Application No. 2017-098035 filed on May 17, 2017, the disclosure of which is hereby incorporated by reference in its entirety.

TECHNICAL FIELD

The present invention relates to secondary particles for an anisotropic magnetic powder and a method of producing an anisotropic magnetic powder.

DESCRIPTION OF THE RELATED ART

JP 2008-91873 A describes a rare earth-iron-nitrogen anisotropic magnetic powder containing zirconium or titanium. The method of this document includes preparing a sulfuric acid solution of samarium, iron, and titanium, adding dropwise an alkaline solution to obtain a precipitate, using the precipitate to produce an oxide, and then reducing the oxide to produce an anisotropic magnetic powder. Owing to the addition of titanium, the powder exhibits excellent coercive force and residual magnetization, but there is still room for improvement.

SUMMARY

The present invention aims to provide a method of producing a titanium-containing rare earth-iron-nitrogen anisotropic magnetic powder having good magnetic properties; and secondary particles for a titanium-containing anisotropic magnetic powder.

DETAILED DESCRIPTION

With an aim to improve magnetic properties, the present inventor extensively examined timing of introduction of the raw materials of magnetic powders. As a result, the present inventor found that by the step of obtaining a precipitate, where a precipitate containing titanium is formed in the initial stage of the step, and then a precipitate free of titanium is formed, the resulting magnetic powder provides improved magnetic properties. This finding has led to the completion of the present invention.

Specifically, the present invention relates to a method of producing an anisotropic magnetic powder, including: obtaining a first precipitate containing R, iron, and titanium by mixing a first precipitating agent with a solution containing R, iron, and titanium, wherein R is at least one selected from the group consisting of Sc, Y, Pr, Nd, Pm, Sm, Gd, Tb, Dy, Ho, Er, Tm, and Lu;
obtaining a second precipitate containing R and iron by mixing, in the presence of the first precipitate, a second precipitating agent with a solution containing R and iron;
obtaining an oxide containing R, iron, and titanium by calcining the second precipitate;
obtaining a partial oxide by heat treating the oxide in a reducing gas atmosphere;
obtaining alloy particles by reducing the partial oxide; and
obtaining an anisotropic magnetic powder by nitriding the alloy particles.

The present invention also relates to secondary particles for an anisotropic magnetic powder containing R, iron, and titanium, each of the secondary particles including:
a core portion comprising primary particles containing R, iron, and titanium; and
a peripheral portion comprising primary particles containing R and iron,
wherein R is at least one selected from the group consisting of Sc, Y, Pr, Nd, Pm, Sm, Gd, Tb, Dy, Ho, Er, Tm, and Lu.

The present invention enables production of a rare earth-iron-nitrogen anisotropic magnetic powder having excellent magnetic properties.

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved. Moreover, numerical ranges indicated using "to" refer to ranges including the numerical values indicated before and after "to" as the minimum and maximum, respectively. Furthermore, when there are multiple substances that correspond to a component included in a composition, the amount of the component in the composition means the combined amount of the multiple substances in the composition, unless otherwise stated.

The method of producing an anisotropic magnetic powder of the embodiments includes:
obtaining a first precipitate containing R, iron, and titanium by mixing a first precipitating agent with a solution containing R, iron, and titanium, wherein R is at least one selected from the group consisting of Sc, Y, Pr, Nd, Pm, Sm, Gd, Tb, Dy, Ho, Er, Tm, and Lu (precipitation step 1);
obtaining a second precipitate containing R and iron by mixing, in the presence of the first precipitate, a second precipitating agent with a solution containing R and iron (precipitation step 2);
obtaining an oxide containing R, iron, and titanium by calcining the second precipitate (oxidation step);
obtaining a partial oxide by heat treating the oxide in a reducing gas atmosphere (pre-treatment step);
obtaining alloy particles by reducing the partial oxide (reduction step); and
obtaining an anisotropic magnetic powder by nitriding the alloy particles (nitridation step).

The precipitate obtained by the present production method is considered to consist of secondary particles, each of which includes a core portion comprising primary particles containing R, iron, and titanium, and a peripheral portion comprising primary particles containing R and iron. The oxide obtained by calcining such a precipitate is considered to have the same structure. Since titanium oxides are not easily reduced by reducing gas, and serve to inhibit reduction of the iron oxide around the titanium oxide, it is considered that when titanium is not present in the peripheral portion as described above, there is a small effect of titanium on the reduction of the iron oxide in the peripheral portion as compared to that in conventional techniques in which titanium is present in the peripheral portion, which permits lowering of the heat treatment temperature in the pre-treatment step. Due to the lower heat treatment temperature, it is considered that the iron particles to be reduced are less likely to form coarse particles than in the conventional techniques, and therefore an anisotropic magnetic powder having excellent magnetic properties is obtained in the nitridation step.

Precipitation Step 1

The precipitation step 1 includes obtaining a first precipitate containing R, iron, and titanium by mixing a first precipitating agent with a solution containing R, iron, and titanium, wherein R is at least one selected from the group consisting of Sc, Y, Pr, Nd, Pm, Sm, Gd, Tb, Dy, Ho, Er, Tm, and Lu. The solution containing R, iron, and titanium may be prepared by appropriately dissolving in a strongly acidic solution an R source, an iron source, and a titanium source in amounts that take into account the precipitate to be obtained in the subsequent precipitation step 2 so that the intended composition of the final product can be obtained. When the main phase to be obtained is $Sm_2Fe_{17}N_3$, the mole ratio of R to Fe (R:Fe) is preferably in the range of 1.5:17 to 3.0:17, more preferably of 2.0:17 to 2.5:17.

With regard to the solution containing R, iron, and titanium, the R source, the iron source, and the titanium source are not limited as long as they are soluble in a strongly acidic solution. From an availability standpoint, for example, the R source may be an oxide of any of the metals, the Fe source may be $FeSO_4$, and the titanium source may be sulfated titania. The concentration of the solution containing R, iron, and titanium may be appropriately adjusted within a range that allows the R, iron, and titanium sources to substantially dissolve in the acidic solution. The acidic solution may be a sulfuric acid solution because of its ability to dissolve the R source, the iron source, and the titanium source.

The solution containing R, iron, and titanium is reacted with a first precipitating agent to obtain an insoluble precipitate containing R, iron, and titanium. The solution containing R, iron, and titanium used is not limited as long as R, iron, and titanium are present during the reaction with the first precipitating agent. For example, sources respectively containing R, iron, and titanium may be prepared as separate solutions and individually added dropwise to react with the first precipitating agent. When the sources are prepared as separate solutions, the concentration of each solution may also be appropriately adjusted within a range that allows the corresponding source to substantially dissolve in the acidic solution. The first precipitating agent is not limited as long as it is an alkaline solution that reacts with the solution containing R, iron, and titanium to give a precipitate. Examples include ammonia water and caustic soda, with caustic soda being preferred.

The precipitation reaction is preferably performed by adding dropwise each of the solution containing R, iron, and titanium, and the first precipitating agent to a solvent such as water because this allows easy adjustment of the properties of the particles of the precipitate. The titanium may be added dropwise as a solution containing it together with R and iron, or may be added dropwise as another solution, separately from a solution containing R and iron. Alternatively, a solution containing R and iron and the first precipitating agent may be added dropwise to a solution containing titanium. A precipitate having a uniform distribution of the constituent elements, a sharp particle size distribution, and a uniform powder particle shape may be produced by appropriately controlling conditions such as the feeding rates of the solution containing R, iron, and titanium and the first precipitating agent, the reaction temperature, the concentration of the reaction solution, and the pH during the reaction. The use of such a precipitate improves the magnetic properties of the final magnetic powder. The reaction temperature may be 0° C. to 50° C., preferably 35° C. to 45° C. The concentration of the reaction solution is preferably 0.65 mol/L to 0.85 mol/L, more preferably 0.7 mol/L to 0.85 mol/L, calculated as total metal ion concentration. The reaction pH is preferably 5 to 9, more preferably 6.5 to 8.

From a magnetic property standpoint, the solution containing R, iron, and titanium preferably further contains tungsten and/or lanthanum. The lanthanum source is not limited as long as it is soluble in a strongly acidic solution. From an availability standpoint, for example, it may be $LaCl_3$. The concentration may be appropriately adjusted within a range that allows the R, iron, titanium, and lanthanum sources to substantially dissolve in the acidic solution. The acidic solution may be a sulfuric acid solution because of its solubility. The tungsten source may be ammonium tungstate. The tungsten source is preferably prepared separately from a solution containing R, iron, titanium, and lanthanum and adjusted within a range that allows it to substantially dissolve in water.

When the solution containing R, iron, and titanium further contains tungsten and/or lanthanum, an insoluble precipitate containing R, iron, titanium, and tungsten and/or lanthanum is obtained. The solution containing R, iron, titanium, and tungsten and/or lanthanum used is not limited as long as R, iron, titanium, and tungsten and/or lanthanum are present during the reaction with the first precipitating agent. For example, these sources may be prepared as separate solutions and individually added dropwise to react with the first precipitating agent. Alternatively, the tungsten and/or lanthanum may be prepared into the same solution containing R and iron.

Precipitation Step 2

The precipitation step 2 includes obtaining a second precipitate containing R and iron by mixing, in the presence of the first precipitate formed in the precipitation step 1, a second precipitating agent with a solution containing R and iron, wherein R is at least one selected from the group consisting of Sc, Y, Pr, Nd, Pm, Sm, Gd, Tb, Dy, Ho, Er, Tm, and Lu. The second precipitating agent in the precipitation step 2 may be the same as or different from the first precipitating agent in the precipitation step 1. The precipitation step 2 is different from the precipitation step 1 in that a solution free of titanium is used. This step may be performed using the same sources and methods as in the precipitation step 1, except that no titanium is used.

Through the precipitation steps 1 and 2, secondary particles for an anisotropic magnetic powder containing R, iron, and titanium is obtained, each of which includes a core portion comprising primary particles containing R, iron, and titanium, and a peripheral portion comprising primary particles containing R and iron. The resultant secondary particles for an anisotropic magnetic powder substantially determine the powder particle size, powder particle shape, and particle size distribution of the final magnetic powder. When the particle size of the secondary particles is measured with a laser diffraction wet particle size analyzer, all the particles preferably have a size and distribution that substantially fall within the range of 0.05 to 20 μm, preferably 0.1 to 10 μm. Moreover, the average particle size is defined as the particle size corresponding to the 50th percentile by volume from the smallest particle size in a particle size distribution, and it is preferably in the range of 0.1 to 10 μm.

The amount of iron used in the precipitation step 1 in which a solution containing titanium is used is preferably 70% by weight or less, more preferably 40% by weight or less of the total amount of iron used in the precipitation steps 1 and 2. If the amount is more than 70% by weight, the resulting peripheral portion may include primary particles containing R, iron, and titanium, which make it difficult to improve magnetic properties. The duration of the precipitation step 1 preferably accounts for 70% or less, more preferably 40% or less of the total duration of all the precipitation steps.

The precipitate, after being separated, is preferably desolvated in order to reduce aggregation of the precipitate caused by evaporation of the residual solvent in which the precipitate has re-dissolved during the heat treatment in the subsequent oxidation step, and to reduce changes in properties such as particle size distribution and powder particle size. When the solvent used is water, for example, a specific desolvation method may include drying in an oven at 70 to 200° C. for 5 hours to 12 hours.

The precipitation step 2 may be followed by washing and separating and the resultant precipitate. The step of washing may be appropriately performed until the conductivity of the supernatant reaches 5 mS/m$^2$ or lower. The step of separating the precipitate may be performed, for example, by adding and mixing a solvent (preferably water) to the resultant precipitate, followed by filtration, decantation, or the like.

Oxidation Step

The oxidation step includes obtaining an oxide containing R, iron, and titanium by calcining the second precipitate formed in the precipitation step 2. The second precipitate may be converted into an oxide by heat treatment, for example. The heat treatment of the second precipitate requires the presence of oxygen. For example, the heat treatment may be performed in an air atmosphere. Since the presence of oxygen is necessary, the precipitate preferably contains oxygen atoms as nonmetallic constituents.

The heat treatment temperature in the oxidation step (hereinafter referred to as the oxidation temperature) is not particularly limited, but it is preferably 700 to 1300° C., more preferably 900 to 1200° C. If the temperature is below 700° C., the oxidation tends to be insufficient. If the temperature exceeds 1300° C., the intended powder particle shape, average particle size, and particle size distribution of the magnetic powder tend not to be obtained. The heat treatment duration is also not particularly limited, but it is preferably one to three hours.

The resultant oxide consists of oxide particles in which R, iron, and titanium have been sufficiently mixed microscopically and which reflect the properties of the precipitate such as shape and particle size distribution.

Pre-Treatment Step

The pre-treatment step includes obtaining a partial oxide in which the oxide obtained in the oxidation step is partially reduced by heat treating the oxide in a reducing gas atmosphere.

The reducing gas may be appropriately selected from, for example, hydrogen ($H_2$), carbon monoxide (CO), hydrocarbon gases such as methane ($CH_4$), and combinations thereof. Hydrogen gas is preferred in terms of cost. The gas flow rate may be appropriately adjusted within a range that prevents dispersal of the oxide. The heat treatment temperature in the pre-treatment step (hereinafter referred to as the pre-treatment temperature) is in the range of 300° C. to 950° C. Preferably, it is 400° C. or higher, more preferably 750° C. or higher, but preferably below 900° C. A pre-treatment temperature of 300° C. or higher leads to effective reduction of the Fe oxide. Also when the pre-treatment temperature is 950° C. or lower, grain growth and segregation of the oxide particles are reduced so that the desired particle size can be maintained. Moreover, when the reducing gas used is hydrogen, preferably the thickness of the oxide layer used is adjusted to 20 mm or less, and the dew point in the reaction furnace is adjusted to −10° C. or lower.

Reduction Step

The reduction step includes obtaining alloy particles containing R, iron, and titanium by reducing the resultant partial oxide, e.g. by mixing the partial oxide with metallic calcium, and heat treating the mixture in an atmosphere of an inert gas other than nitrogen such as argon, or in vacuum.

The oxide is reduced by contact with molten calcium or calcium vapor. The heat treatment temperature in the reduction step (hereinafter referred to as the reduction temperature) is in the range of 700 to 1200° C., preferably 800 to 1100° C. If lanthanum is present, the temperature is preferably in the range of 920 to 1200° C. Although diffusion of lanthanum takes place as long as the temperature is set at no lower than 920° C. which is the melting point of lanthanum, the temperature is preferably 950° C. or higher to ensure sufficient diffusion. The heat treatment duration may be in the range of 10 minutes to 10 hours, preferably 10 minutes to 2 hours, to achieve a more uniform reduction reaction.

The metallic calcium is used in the form of granules or powder, and its particle size is preferably 10 mm or less in order to more effectively reduce aggregation during the reduction reaction. The metallic calcium may be added in an amount that is 1.1 to 3.0 times, preferably 1.5 to 2.0 times the equivalent weight for the reaction (the stoichiometric amount required to reduce the rare earth oxide, which, if Fe is present as an oxide, includes the amount required to reduce the latter oxide).

In the reduction step, the metallic calcium reductant may be used in combination with a disintegrating accelerator, if necessary. The disintegrating accelerator may appropriately be used to facilitate the disintegration and granulation of the product during the water washing step, which will be described later. Examples include alkaline earth metal salts such as calcium chloride and alkaline earth oxides such as calcium oxide. The disintegrating accelerator is used in an amount of 1 to 30% by mass, preferably 5 to 30% by mass of the rare earth oxide used as the rare earth source.

Nitridation Step

The nitridation step includes obtaining anisotropic magnetic particles by nitriding the alloy particles obtained in the reduction step. Since the particulate precipitate obtained in the precipitation step is used instead of fusing metals together, the alloy particles obtained in the reduction step are in porous bulk form. This permits the alloy particles to be directly heat treated in a nitrogen atmosphere for nitridation without being crushed. Thus, uniform nitridation is achieved.

The heat treatment temperature in the nitridation of the alloy particles (hereinafter referred to as the nitridation temperature) is set to 300 to 600° C., particularly 400 to 550° C., and the atmosphere is purged with nitrogen in this temperature range. The heat treatment duration is not limited as long as the alloy particles are sufficiently uniformly nitride. For example, it is about 2 to 30 hours.

In some cases, the product resulting from the nitridation step contains, in addition to the magnetic particles, contaminants such as CaO by-product and unreacted metallic calcium, and thus forms a composite with these contaminants in sintered bulk form. In such cases, the product may be added to cool water to separate CaO and metallic calcium as suspended calcium hydroxide ($Ca(OH)_2$) from the magnetic particles. The residual calcium hydroxide may then be sufficiently removed by washing the magnetic particles with acetic acid or the like. When the product is added to water, the oxidation of metallic calcium by water and the hydration of CaO by-product induce disintegration, i.e. pulverization, of the composite reaction product in sintered bulk form. Next, a phosphoric acid solution as a surface treatment agent is added in an amount in the range equivalent to 0.10 to 10 wt % of $PO_4$ relative to the solids of the magnetic particles obtained in the nitridation step. The particles may be appropriately separated from the solution and dried to obtain an anisotropic magnetic powder.

The anisotropic magnetic powder produced as above is typically represented by the following formula:

$$R_{v-x}Fe_{(100-v-w-t-z)}N_w Ti_t La_x W_z$$

wherein R is at least one selected from the group consisting of Sc, Y, Pr, Nd, Pm, Sm, Gd, Tb, Dy, Ho, Er, Tm, and Lu; $3 \leq v \leq 30$; $5 \leq w \leq 15$; $0 < t \leq 1.0$; $0 \leq x \leq 1.0$; and $0 \leq z \leq 2.5$.

In the formula, v is specified as a value in the range of 3 to 30. This is because if the value is below 3, the unreacted iron component (α-Fe phase) may be separated, so that the coercive force of the nitride may decrease, failing to provide a practical magnet; and if the value is above 30, the at least one element selected from the group consisting of Sc, Y, Pr, Nd, Pm, Sm, Gd, Tb, Dy, Ho, Er, Tm, and Lu may precipitate and make the magnetic powder unstable in the air, thereby resulting in a decrease in remanence. Moreover, w is specified as a value in the range of 5 to 15. This is because if the value is below 5, almost no coercive force may be exhibited; and if the value is above 15, iron or the at least one element selected from the group consisting of Sc, Y, Pr, Nd, Pm, Sm, Gd, Tb, Dy, Ho, Er, Tm, and Lu itself may form a nitride.

From a magnetic property standpoint, R is preferably Sm; t ranges from more than 0 to 1.0, preferably 0.1 to 0.5; x is 0 to 1.0, preferably 0.3 to 0.8; and z is 0 to 2.5, preferably 0.1 to 0.5.

Composite Materials

Composite materials and bonded magnets are described below.

The anisotropic magnetic powder described above may be used with a resin to prepare a composite material. Due to the presence of the anisotropic magnetic powder, the composite material provides high magnetic properties.

The resin contained in the composite material may be a thermosetting resin or a thermoplastic resin, but it is preferably a thermoplastic resin. Specific examples of the thermoplastic resin include polyphenylene sulfide resins (PPS), polyether ether ketones (PEEK), liquid crystal polymers (LCP), polyamides (PA), polypropylenes (PP), and polyethylenes (PE).

In the preparation of the composite material, the mixing ratio of the resin to the anisotropic magnetic powder (resin/magnetic powder) is preferably 0.10 to 0.15, more preferably 0.11 to 0.14.

For example, the composite material may be prepared by mixing the anisotropic magnetic powder with the resin at 280 to 330° C. using a kneading machine.

Bonded Magnets

The composite material may be used to produce a bonded magnet. Specifically, for example, the bonded magnet may be produced by heat treating the composite material in an orientation field to align the easy axes of magnetization (orientation step), followed by pulse magnetization in a magnetizing field (magnetization step).

The heat treatment temperature in the orientation step is preferably, for example, 90 to 200° C., more preferably 100 to 150° C. The magnitude of the orientation field in the orientation step may be, for example, 720 kA/m. The magnitude of the magnetizing field in the magnetization step may be, for example, 1500 to 2500 kA/m.

EXAMPLES

Examples are described below. It should be noted that "%" is by mass unless otherwise specified.

Preparation Example 1

Fe—Sm Sulfuric Acid Solution $FeSO_4 \cdot 7H_2O$ (5.0 kg) was mixed and dissolved in pure water (2.0 kg). Then, $Sm_2O_3$ (0.49 kg) and 70% sulfuric acid (0.74 kg) were added to the mixture and completely dissolved with adequate stirring. Next, pure water was added to the resultant solution to adjust the final Fe and Sm concentrations to 0.726 mol/l and 0.112 mol/l, respectively. The resulting solution was used as a Fe—Sm sulfuric acid solution.

Preparation Example 2

Fe—Sm—La Sulfuric Acid Solution $FeSO_4 \cdot 7H_2O$ (5.0 kg) was mixed and dissolved in pure water (20.0 kg). Then, $Sm_2O_3$ (0.48 kg), 31.8% $LaCl_3$ (0.071 kg), and 70% sulfuric acid (0.72 kg) were added to the mixture and completely dissolved with adequate stirring. Next, pure water was added to the resultant solution to adjust the final Fe, Sm, and La concentrations to 0.726 mol/l, 0.109 mol/l, and 0.0063 mol/l, respectively. The resulting solution was used as a Fe—Sm—La sulfuric acid solution, which was then used in the precipitation steps 1 and 2.

Preparation Example 3

W Solution

6% hydrochloric acid (0.59 kg) and ammonium paratungstate (0.313 kg) were mixed in pure water (2.0 kg), and the resulting precipitate was washed. The precipitate was mixed and dissolved in pure water (2.0 kg) and 17% ammonia water (494 g) to adjust the concentration to 12.5 wt %. The resulting solution was used as a W solution, which was then used in the precipitation steps 1 and 2.

Preparation Example 4

Ti Sulfuric Acid Solution

Sulfated titania (0.0186 kg) and 70% sulfuric acid (0.093 g) were mixed and dissolved in pure water (0.743 kg) to adjust the concentration to 0.5%. The resulting solution was used as a Ti sulfuric acid solution, which was then used in the precipitation step 1.

Example 1

Fe—Sm—Ti

Precipitation Steps 1 and 2

The whole amount of the Ti sulfuric acid solution (1.70 kg) obtained in Preparation Example 4 was mixed in pure water (20 kg) maintained at 40° C. Then, the whole amount of the Fe—Sm sulfuric acid solution obtained in Preparation Example 1 was added dropwise with stirring over 70 minutes from the start of the reaction, and at the same time a 15% ammonia solution was added dropwise to adjust the pH to 7 to 8. Thus, a slurry containing a Fe—Sm—Ti hydroxide was obtained. The slurry was washed with pure water and decanted to separate the hydroxide by solid-liquid separation. The separated hydroxide was dried in an oven at 100° C. for 10 hours.

Oxidation Step

The hydroxide obtained through the precipitation steps was calcined in the air at 900° C. for one hour. After cooling, a red Fe—Sm—Ti oxide was obtained as base powder.

Pre-Treatment Step

The Fe—Sm—Ti oxide (100 g) obtained as above was put into a steel container to a bulk height of 10 mm. The container was placed in a furnace, and the pressure was decreased to 100 Pa. Then, the container was heated to 850° C. (the pre-treatment temperature indicated in Table 1) while introducing hydrogen gas, and this temperature was maintained for 15 hours. Thus, a black partial oxide was obtained in which the oxygen bonded to Sm remained unreduced while 95% of the oxygen bonded to Fe was reduced.

Reduction Step

The partial oxide (60 g) obtained in the pre-treatment step and metallic calcium (19.2 g) having an average particle size of about 6 mm were mixed together and placed in a furnace. After the furnace was vacuum evacuated, argon gas (Ar gas) was introduced. The reduction temperature was increased to 1045° C., and this temperature was maintained for two hours. Thus, Fe—Sm—Ti alloy particles were obtained.

Nitridation Step

Subsequently, the interior of the furnace was cooled to 100° C. and then vacuum evacuated. The furnace was heated to 450° C. while introducing hydrogen gas, and this temperature was maintained for 23 hours. Thus, a bulk product containing magnetic particles was obtained.

Water Washing/Surface Treatment Step

The bulk product obtained in the nitridation step was added to pure water (3 kg), followed by stirring for 30 minutes. After the mixture was allowed to stand, the supernatant was discharged by decantation. The addition to pure water, stirring, and decantation were repeated 10 times. Then, 99.9% acetic acid (2.5 g) was added, followed by stirring for 15 minutes. After the mixture was allowed to stand, the supernatant was discharged by decantation. The addition to pure water, stirring, and decantation were repeated twice.

A phosphoric acid solution was added to the resultant slurry. The phosphoric acid solution was added in an amount equivalent to 1 wt % of $PO_4$ relative to the solids of the magnetic particles. The mixture was stirred for five minutes, followed by solid-liquid separation and then vacuum-drying at 80° C. for three hours to obtain a magnetic powder. The magnetic powder was represented by $Sm_{8.8}Fe_{77.1}N_{13.66}Ti_{0.44}$.

Evaluation

Magnetic Properties

The magnetic particles obtained by the production method of the example were packed into a sample vessel together with a paraffin wax. After the paraffin wax was melted with a dryer, the easy axes of magnetization were aligned in an orientation field of 16 kA/m. The magnetically oriented sample was pulse magnetized in a magnetizing field of 32 kA/m. The remanence, coercive force, and squareness ratio were measured with a VSM (vibrating sample magnetometer) with a maximum field of 16 kA/m. Table 1 shows the evaluation results.

Example 2

Fe—Sm—Ti

A black partial oxide with 95% reduction and a magnetic powder represented by $Sm_{9.00}Fe_{76.8}N_{13.76}Ti_{0.44}$ were prepared as in Example 1, except that in the precipitation steps 1 and 2 of Example 1, the Ti sulfuric acid solution (1.70 kg) obtained in Preparation Example 4 was added dropwise to pure water (20 kg) maintained at 40° C. over 20 minutes from the start of the reaction, and the whole amount of the Fe—Sm sulfuric acid solution obtained in Preparation Example 1 was added dropwise with stirring over 70 minutes from the start of the reaction. Table 1 shows the results of the measurement of the magnetic properties of the magnetic powder.

Comparative Example 1

Fe—Sm—Ti

A black partial oxide with 95% reduction and a magnetic powder represented by $Sm_{9.2}Fe_{77.0}N_{13.58}Ti_{0.42}$ were prepared as in Example 1, except that in the precipitation steps 1 and 2 of Example 1, the Ti sulfuric acid solution (1.7 kg) obtained in Preparation Example 4 and the whole amount of the Fe—Sm sulfuric acid solution obtained in Preparation Example 1 were added together dropwise to pure water (2 kg) maintained at 40° C. with stirring over 70 minutes from the start of the reaction, and that the pre-treatment temperature was 900° C. Table 1 shows the results of the measurement of the magnetic properties of the magnetic powder.

Example 3

Fe—Sm—Ti

A black partial oxide with 95% reduction and a magnetic powder represented by $Sm_{9.1}Fe_{77.2}N_{13.0}Ti_{0.21}$ were prepared as in Example 2, except that in the precipitation steps 1 and 2 of Example 2, the amount of the Ti sulfuric acid solution was 0.85 kg, and the pre-treatment temperature was 800° C. Table 1 shows the results of the measurements of the magnetic properties of the magnetic powder.

Comparative Example 2

Fe—Sm—Ti

A black partial oxide with 95% reduction and a magnetic powder represented by $Sm_{9.0}Fe_{76.9}N_{13.9}Ti_{0.20}$ were prepared as in Comparative Example 1, except that the amount of the Ti sulfuric acid solution was 0.85 kg, and the pre-treatment temperature was 850° C. Table 1 shows the results of the measurement of the magnetic properties of the magnetic powder.

TABLE 1

| Example No. | Mole ratio of Ti | Ti addition method | Pre-treatment temperature (° C.) | Remanence ($\sigma r$) | Coercive force (iHc) | Squareness ratio (Hk) |
|---|---|---|---|---|---|---|
| Example 1 | 0.1 | The whole amount added before the start of the reaction | 850 | 110 | 19453 | 8210 |
| Example 2 | 0.1 | Added over 20 min from the start of the reaction | 850 | 114 | 18000 | 7295 |
| Comparative Example 1 | 0.1 | Continuously added over the entire precipitation process | 900 | 106.4 | 16619 | 6721 |
| Example 3 | 0.05 | Added over 20 min from the start of the reaction | 800 | 114.5 | 18000 | 7468 |
| Comparative Example 2 | 0.05 | Continuously added over the entire precipitation process | 850 | 105 | 14740 | 5135 |

The results in Table 1 show that when the mole ratio of Ti was 0.1, the heat treatment temperature required to obtain a partial oxide having a similar degree of reduction in the pre-treatment step was lower in Examples 1 and 2 than in Comparative Example 1, and the magnetic powders obtained in these examples exhibited improved remanence $\sigma r$, coercive force iHc, and squareness ratio Hk. Moreover, when the mole ratio of Ti was 0.05, the heat treatment temperature was lower in Example 3 than in Comparative Example 2, and the magnetic powder obtained in this example exhibited improved remanence $\sigma r$, coercive force iHc, and squareness ratio Hk. Thus, it is understood that reacting titanium in the initial stage of the reaction is effective in lowering the heat treatment temperature and improving the magnetic properties.

Example 4

Fe—Sm—Ti—W

A black partial oxide with 95% reduction and a magnetic powder represented by $Sm_{8.9}Fe_{76.8}N_{13.89}Ti_{0.22}W_{0.19}$ were prepared as in Example 3, except that the whole amount of the Fe—Sm sulfuric acid solution obtained in Preparation Example 1 and the W solution (100.9 g) obtained in Preparation Example 3 were added together dropwise with stirring over 70 minutes from the start of the reaction. Table 2 shows the results of the measurements of the magnetic properties of the magnetic powder.

Comparative Example 3

Fe—Sm—Ti—W

A black partial oxide with 95% reduction and a magnetic powder represented by $Sm_{9.0}Fe_{76.9}N_{13.7}Ti_{0.21}W_{0.19}$ were prepared as in Comparative Example 2, except that the whole amount of the Fe—Sm sulfuric acid solution obtained in Preparation Example 1 and the W solution (100.9 g) obtained in Preparation Example 3 were added together dropwise with stirring over 70 minutes from the start of the reaction. Table 2 shows the results of the measurements of the magnetic properties of the magnetic powder.

TABLE 2

| Example No. | Mole ratio of Ti | Mole ratio of W | Ti addition method | Pre-treatment temperature (° C.) | Remanence ($\sigma r$) | Coercive force (iHc) | Squareness ratio (Hk) |
|---|---|---|---|---|---|---|---|
| Example 4 | 0.05 | 0.05 | Added over 20 min from the start of the reaction | 800 | 109.7 | 18182 | 7712 |
| Comparative Example 3 | 0.05 | 0.05 | Continuously added over the entire precipitation process | 850 | 75.2 | 17041 | 6547 |

The results in Table 2 show that when the mole ratio of Ti was 0.05 and the mole ratio of W was 0.05, the heat treatment temperature required to obtain a partial oxide having a similar degree of reduction in the pre-treatment step was lower in Example 4 than in Comparative Example 3, and the magnetic powder obtained in this example exhibited improved remanence σr, coercive force iHc, and squareness ratio Hk. Thus, it is understood that also when tungsten is added, reacting titanium in the initial stage of the reaction is effective in lowering the heat treatment temperature and improving the magnetic properties.

Example 5

Fe—Sm—Ti—W—La

A black partial oxide with 95% reduction and a magnetic powder represented by $Sm_{8.99}Fe_{77.3}N_{13.24}Ti_{0.22}La_{0.14}W_{0.11}$ were prepared as in Example 4, except that the whole amount of the Fe—Sm—La sulfuric acid solution obtained in Preparation Example 2 was used instead of the Fe—Sm sulfuric acid solution, and the amount of the W solution was 50.4 g. Table 3 shows the results of the measurement of the magnetic properties of the magnetic powder.

Comparative Example 4

Fe—Sm—Ti—W—La

A black partial oxide with 95% reduction and a magnetic powder represented by $Sm_{9.02}Fe_{77.0}N_{13.52}Ti_{0.21}La_{0.15}W_{0.10}$ were prepared as in Comparative Example 3, except that the whole amount of the Fe—Sm—La sulfuric acid solution obtained in Preparation Example 2 was used instead of the Fe—Sm sulfuric acid solution, and the amount of the W solution was 50.4 g. Table 3 shows the results of the measurements of the magnetic properties of the magnetic powder.

TABLE 3

| Example No. | Mole ratio of Ti | Mole ratio of W | Mole ratio of La | Ti addition method | Pre-treatment temperature (° C.) | Remanence (σr) | Coercive force (iHc) | Squareness ratio (Hk) |
|---|---|---|---|---|---|---|---|---|
| Example 5 | 0.05 | 0.025 | 0.15 | Added over 20 min from the start of the reaction | 800 | 118.2 | 20780 | 7068 |
| Comparative Example 4 | 0.05 | 0.025 | 0.15 | Continuously added over the entire precipitation process | 850 | 114 | 20802 | 6483 |

The results in Table 3 show that when the mole ratio of Ti was 0.05, the mole ratio of W was 0.025, and the mole ratio of La was 0.15, the heat treatment temperature required to obtain a partial oxide having a similar degree of reduction in the pre-treatment step was lower in Example 5 than in Comparative Example 4, and the magnetic powder obtained in this example exhibited improved remanence σr and squareness ratio Hk. Thus, it is understood that also when tungsten and lanthanum are added, reacting titanium in the initial stage of the reaction is effective in lowering the heat treatment temperature and improving the magnetic properties.

Since the anisotropic magnetic powder obtained by the production method of the present invention has high magnetic properties, it is suitably applicable as a composite material or a bonded magnet for motors or other applications.

The invention claimed is:

1. A method of producing an anisotropic magnetic powder, comprising:
   obtaining a first precipitate containing R, iron, and titanium by mixing a first precipitating agent with a solution containing R, iron, and titanium, wherein R is at least one selected from the group consisting of Sc, Y, Pr, Nd, Pm, Sm, Gd, Tb, Dy, Ho, Er, Tm, and Lu;
   obtaining a second precipitate containing R and iron and titanium by mixing, in the presence of the first precipitate, a second precipitating agent with a solution containing R and iron without titanium;
   obtaining an oxide containing R, iron, and titanium by calcining the second precipitate;
   obtaining a partial oxide by heat treating the oxide in a reducing gas atmosphere;
   obtaining alloy particles by reducing the partial oxide; and
   obtaining an anisotropic magnetic powder by nitriding the alloy particles.

2. The method of producing an anisotropic magnetic powder according to claim 1,
   wherein the solution containing R, iron, and titanium used in the step of obtaining the first precipitate containing R, iron, and titanium, and the solution containing R and iron without titanium used in the step of obtaining the second precipitate containing R and iron and titanium each further contain tungsten.

3. The method of producing an anisotropic magnetic powder according to claim 1,
   wherein the solution containing R, iron, and titanium used in the step of obtaining the first precipitate containing R, iron, and titanium, and the solution containing R and iron without titanium used in the step of obtaining the second precipitate containing R and iron and titanium each further contain lanthanum.

4. The method of producing an anisotropic magnetic powder according to claim 1,
   wherein the anisotropic magnetic powder is represented by the following formula:

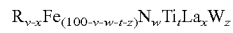

$$R_{v-x}Fe_{(100-v-w-t-z)}N_wTi_tLa_xW_z$$

wherein R is at least one selected from the group consisting of Sc, Y, Pr, Nd, Pm, Sm, Gd, Tb, Dy, Ho, Er, Tm, and Lu; $3 \leq v \leq 30$; $5 \leq w \leq 15$; $0 < t \leq 1.0$; $0 \leq x \leq 1.0$; and $0 \leq z \leq 2.5$.

5. The method of producing an anisotropic magnetic powder according to claim 1,
   wherein R is Sm.

6. The method of producing an anisotropic magnetic powder according to claim 2,
   wherein the solution containing R, iron, and titanium used in the step of obtaining the first precipitate containing R, iron, and titanium, and the solution containing R and iron without titanium used in the step of obtaining the second precipitate containing R and iron and titanium each further contain lanthanum.

7. The method of producing an anisotropic magnetic powder according to claim 2,
wherein the anisotropic magnetic powder is represented by the following formula:

$$R_{v-x}Fe_{(100-v-w-t-z)}N_w Ti_t La_x W_z$$

wherein R is at least one selected from the group consisting of Sc, Y, Pr, Nd, Pm, Sm, Gd, Tb, Dy, Ho, Er, Tm, and Lu; $3 \leq v \leq 30$; $5 \leq w \leq 15$; $0 < t \leq 1.0$; $0 \leq x \leq 1.0$; and $0 \leq z \leq 2.5$.

8. The method of producing an anisotropic magnetic powder according to claim 2,
wherein R is Sm.

9. The method of producing an anisotropic magnetic powder according to claim 3,
wherein the anisotropic magnetic powder is represented by the following formula:

$$R_{v-x}Fe_{(100-v-w-t-z)}N_w Ti_t La_x W_z$$

wherein R is at least one selected from the group consisting of Sc, Y, Pr, Nd, Pm, Sm, Gd, Tb, Dy, Ho, Er, Tm, and Lu; $3 \leq v \leq 30$; $5 \leq w \leq 15$; $0 < t \leq 1.0$; $0 \leq x \leq 1.0$; and $0 \leq z \leq 2.5$.

10. The method of producing an anisotropic magnetic powder according to claim 3,
wherein R is Sm.

11. The method of producing an anisotropic magnetic powder according to claim 4,
wherein R is Sm.

* * * * *